(12) United States Patent
Yamamoto et al.

(10) Patent No.: US 6,778,963 B2
(45) Date of Patent: Aug. 17, 2004

(54) SPEECH RECOGNITION SYSTEM FOR CAR NAVIGATION AND MICROPHONE

(75) Inventors: Toru Yamamoto, Kanagawa (JP); Makoto Akabane, Tokyo (JP); Yoshikazu Takahashi, Saitama (JP); Masashi Ohkubo, Kanagawa (JP); Eiji Yamamoto, Saitama (JP); Satoko Ikezawa, Tokyo (JP)

(73) Assignee: Sony Corporation, Tokyo (JP)

( * ) Notice: Subject to any disclaimer, the term of this patent is extended or adjusted under 35 U.S.C. 154(b) by 235 days.

(21) Appl. No.: 09/859,276

(22) Filed: May 17, 2001

(65) Prior Publication Data

US 2002/0038215 A1 Mar. 28, 2002

(30) Foreign Application Priority Data

May 19, 2000 (JP) ........................................ 2000-148949

(51) Int. Cl.[7] .............................................. G10L 15/00
(52) U.S. Cl. ....................................................... 704/275
(58) Field of Search ................................ 704/270, 275; 381/86, 365

(56) References Cited

U.S. PATENT DOCUMENTS

| 4,797,924 | A | * | 1/1989 | Schnars et al. | ............... | 381/43 |
| 5,274,560 | A | * | 12/1993 | LaRue | .......... | 701/202 |
| 5,319,736 | A | * | 6/1994 | Hunt | .......... | 395/2.36 |
| 5,452,212 | A | * | 9/1995 | Yokoyama et al. | ......... | 701/211 |
| 5,535,258 | A | * | 7/1996 | Joglekar et al. | ............... | 379/58 |
| 5,848,170 | A | * | 12/1998 | Mahieux et al. | ............... | 381/92 |
| 6,111,964 | A | * | 8/2000 | Ishibashit | .................... | 381/86 |
| 6,112,174 | A | * | 8/2000 | Wakisaka et al. | ........... | 704/251 |
| 6,134,335 | A | * | 10/2000 | Yang | .......... | 381/365 |
| 6,167,116 | A | * | 12/2000 | Freadman | ................ | 379/88.01 |
| 6,277,679 | B1 | * | 8/2001 | Ohtani | ........................ | 438/151 |
| 6,466,136 | B2 | * | 10/2002 | DeLine et al. | ........... | 340/815.4 |

FOREIGN PATENT DOCUMENTS

JP            60 40909        3/1985

* cited by examiner

*Primary Examiner*—Daniel Abebe
(74) *Attorney, Agent, or Firm*—Frommer Lawrence & Haug LLP; William S. Frommer

(57) ABSTRACT

An in-vehicle device which is capable of performing control by means of speech recognition includes a monitor for displaying map and other information and a speech input microphone connected to the monitor.

10 Claims, 10 Drawing Sheets

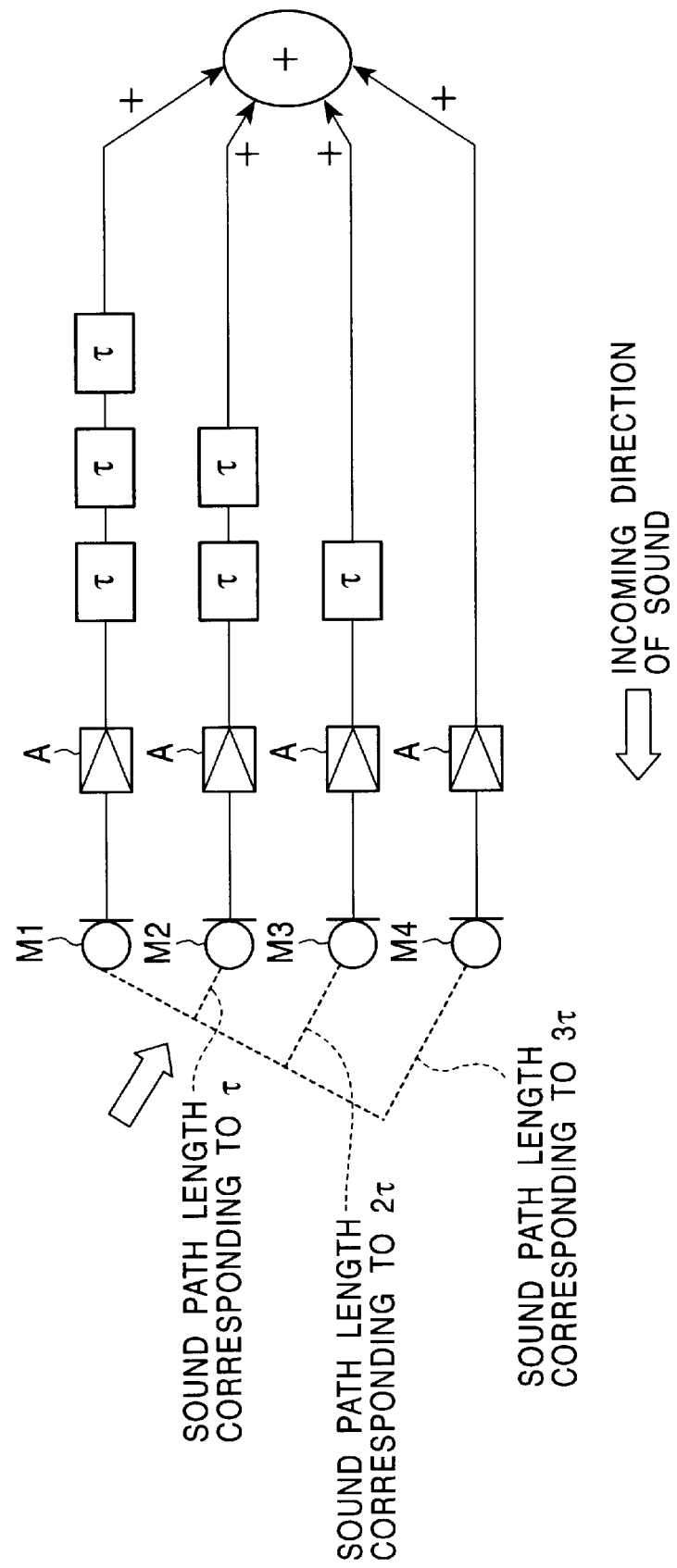

SPEECH RECOGNITION SYSTEM FOR CAR NAVIGATION AND MICROPHONE

BACKGROUND OF THE INVENTION

1. Field of the Invention

The present invention relates to in-vehicle devices, and more particularly relates to a car navigation system equipped with a speech-recognition function.

2. Description of the Related Art

Car navigation systems employing GPS (Global Positioning System) have been widely used. This car navigation system includes a display unit (monitor) for displaying map information and the like, a main unit for containing a computation processing unit and the like therein, a remote control unit for inputting control information into the car navigation system, and the like.

Recently, a car navigation system provided with a speech input device having a speech-recognition function as a device for inputting control information into the navigation system other than the remote control unit has come into use. This car navigation system provided with this speech input device includes a speech input microphone. Conventionally, this microphone has been installed on, for example, an in-vehicle dashboard, a steering column, a sun visor, an A pillar unit, or the like, and it is connected to a microphone cable led from the main unit of the car navigation system.

The main units of car navigation systems are often provided in trunks instead of the cabins. Accordingly, in the car navigation device provided with the speech input device, the microphone cable is led from the trunk and is connected to the microphone on the dashboard or the like inside the cabin. This requires the length of the microphone cable to be as long as 7 m. This also makes the wiring work for the microphone cable complicated.

Providing a noise microphone for inputting a noise signal thereinto, in addition to the speech input microphone, in the speech input device of the car navigation system is proposed and comes into practical use. A signal that is input into the speech input microphone is a mixture of the speech signal and the noise signal. A signal that is input into the noise microphone is primarily the noise signal. By subtracting the signal captured from the noise microphone from the signal captured from the speech input microphone, only the speech signal can be extracted. However, the provision of the two microphones, i.e. the speech input microphone and the noise microphone is disadvantageous in terms of the cost. Therefore, it is desirable that a preferable S/N (signal to noise) ratio is realized using a single microphone.

The speech input device for solving such a problem is disclosed in Japanese Unexamined Patent Application Publication No. 10-11084. This publication is characterized in that the speech input device of an in-vehicle navigation system includes a navigation wireless remote control unit for performing remote control and the microphone for inputting the speech into the speech input device so that the input speech is controlled using the speech recognition wherein the microphone is provided in the navigation wireless remote control unit. Since the microphone is disposed in the wireless remote control unit for inputting a control signal of the car navigation system into the navigation system, no wiring work for the microphone cable is required. In addition, when a user inputs the speech into the microphone, one can speak into the microphone incorporated in the remote control unit while having one's mouth close to the remote control unit. Therefore, less noise influences input of the speech.

As described above, the speech input device disclosed in this publication capable of solving the conventional problem is useful.

However, the user must hold this wireless remote control unit in order to input the speech into the microphone incorporated in the wireless remote control unit. When the user inputs the speech while driving, the speech input may interfere with the driving operation.

SUMMARY OF THE INVENTION

Accordingly, it is an object of the present invention to provide an in-vehicle device, particularly, a car navigation system which does not require a long cable for a microphone and which requires no or simple microphone cable wiring work. It is another object of the present invention to provide the in-vehicle device, particularly, the car navigation system which prevents the speech input from interfering with the driving operation.

To this end, according to a first aspect of the present invention, there is provided an in-vehicle device capable of performing control by means of speech recognition, including a monitor for displaying map and other information and a speech input microphone connected to the monitor.

The present invention is made by noting use of the monitor as an object to have a microphone cable led from the monitor. In the in-vehicle device, the monitor is normally disposed on a dashboard. Therefore, when the microphone cable is led from the monitor and the microphone is installed on, for example, the dashboard, the cable wiring becomes simple and the length required for the cable wiring becomes shorter. In addition, since the microphone led from the monitor may be installed on, apart from the dashboard, a conventional part such as a steering column, a sun visor, or an A pillar unit, a user does not have to hold the microphone.

It is possible to even eliminate the microphone cable itself. The foregoing problem can be solved by integrating the microphone in the enclosure constituting the monitor. In this case, since there is no microphone cable, the wiring work is not necessary. In addition, since the microphone cable is not exposed in the cabin, there is no risk in that the exposed cable spoils the appearance.

The microphone may be connected to the monitor directly or via a cable. According to the form in which the microphone is connected via the cable to the monitor, the amount of wiring work is considerably decreased compared to a conventional case in which the cable is wired from the trunk to the front part of the cabin. The length of the cable required for wiring is considerably decreased compared to the conventional case. According to the form in which the microphone is directly connected to the monitor, the necessity of the wiring is eliminated. Due to the lack of cable wiring in the cabin, exposed microphone cable is prevented and the appearance remains unspoiled.

When the microphone is installed via the cable on the monitor, the installation part of the monitor is arbitrary. That is, it may be installed on a conventional part such as the dashboard, the steering column, the sun visor, and the A pillar unit.

When the microphone is directly installed on the monitor, the microphone may be installed on the outside of an enclosure of the monitor, or the microphone may be installed on the inside of the enclosure of the monitor.

The number of the microphones connected to the monitor may be one or more than one. In addition, the cable or the microphone may be connected so as to be attachable to the monitor. When the microphone is connected to the monitor, the microphone may be fixed to the monitor. The microphone may be connected to the monitor in such a manner that the orientation of the microphone is adjustable. This is because it is desirable that the optimum orientation of the directivity axis of the microphone be set for each speaker. A method for altering the direction of the microphone is performed manually or by means of a driving source such as a motor.

A typical application of the in-vehicle device according to the present invention is a car navigation system. According to a second aspect of the present invention, a car navigation system includes a recognizing unit for recognizing input speech, a monitor for displaying a recognition result from the recognizing unit, and a microphone, integrally connected to the monitor, for inputting the speech. The present invention may be applied to other in-vehicle devices, such as a car audio system.

In the vehicle, other than speech for the speech recognition, noise such as a sound of an engine is input into the microphone. Accordingly, a noise-reducing unit for reducing a noise input from the microphone may be provided in the car navigation system. A wide variety of known noise-reducing units may be applied to this noise-reducing unit. When the microphone is directly connected to the monitor, a diffraction effect of the entire monitor improves the sensitivity of the microphone, which prevents the noise. Therefore, in this case, the monitor serves as the noise reducing unit.

Conventionally, independent of the microphone for speech, a microphone for capturing the noise has been provided as the noise-reducing unit. In the present invention, the microphone for speech is provided on one of the front and the rear faces of the monitor while the microphone for noise is provided on the other face. That is, according to a third aspect of the present invention, a monitor device includes a monitor main body for displaying map and other information, a speech input microphone provided on one of the front and rear faces of the monitor main body, and a noise input microphone provided on the other face of the monitor main body. The microphone for noise serves as the noise-reducing unit and is characterized in that the microphone for the noise is disposed on one face of the monitor which is the opposite face of the monitor on which the microphone for speech is disposed.

Further advantages of the present invention become apparent from the following description of the preferred embodiments.

BRIEF DESCRIPTION OF THE DRAWINGS

FIG. 14 is a diagram illustrating one example of a sound-source estimating method;

DESCRIPTION OF THE PREFERRED EMBODIMENTS

First Embodiment

Figure 1:
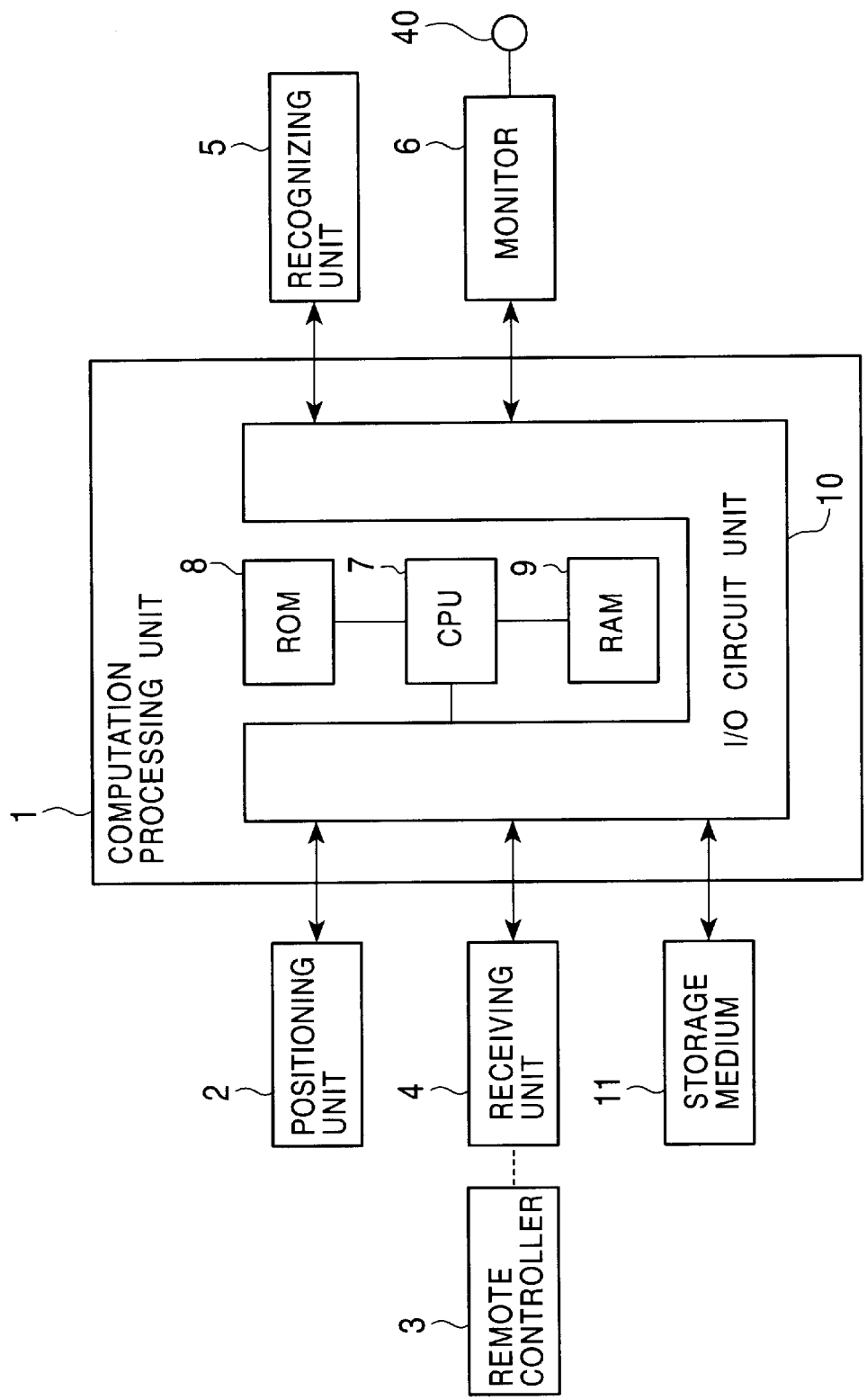
FIG. 1 is a block diagram showing the system construction of a car navigation system according to a first embodiment of the present invention.

FIG. 1 shows the overall system construction of a car navigation system according to the first embodiment. The car navigation system includes a computation-processing unit 1 for controlling the overall navigation system, a positioning unit 2 for performing positioning, a remote controller 3 for serving as an operation unit of the car navigation system, a receiving unit 4 for receiving operation information from the remote controller 3, a recognizing unit 5 for applying a recognition process to the input speech, and a monitor 6 for displaying map and other information.

The computation-processing unit 1 includes a CPU 7 for controlling the entire system, a ROM 8 for storing a predetermined program therein, a RAM 9 for storing a variety of data therein, and an I/O circuit unit 10 for performing input/output operations with the positioning unit 2, the receiving unit 4, the recognizing unit 5, the monitor 6, and the like.

The positioning unit 2 performs positioning using the GPS. That is, the positioning unit 2 performs positioning computations based on a signal (electric wave) of 1575.42 MHz which is received at a receiving antenna (not shown) and which is transmitted from a plurality of (normally, four or more) GPS satellites at an altitude of approximately 20,000 km, and then the positioning unit 2 transfers the computed position data representing the present position to the computation-processing unit 1.

Various operations of this car navigation system can be performed using the remote controller 3. For example, this remote controller 3 can cause an operation menu to be displayed on the monitor 6, can change a display range of an electronic map displayed on the monitor 6, can move cursors over various operation menus displayed on the monitor 6, and the like. The remote controller 3 wirelessly transmits a signal based on the input operation information to the receiving unit 4. This signal is input into the computation-processing unit 1 in which the desired operation is performed.

The monitor 6 is connected to a speech input microphone 40. In the same manner as in the remote controller 3, various operations of the car navigation system can be also controlled by means of the speech that is input into this microphone 40, and the result of this operation is displayed on the monitor 6. For example, when a destination is instructed by the speech, map information including the destination is displayed on the monitor 6. The recognizing process is performed on the input speech input into the microphone 40.

Figure 2:
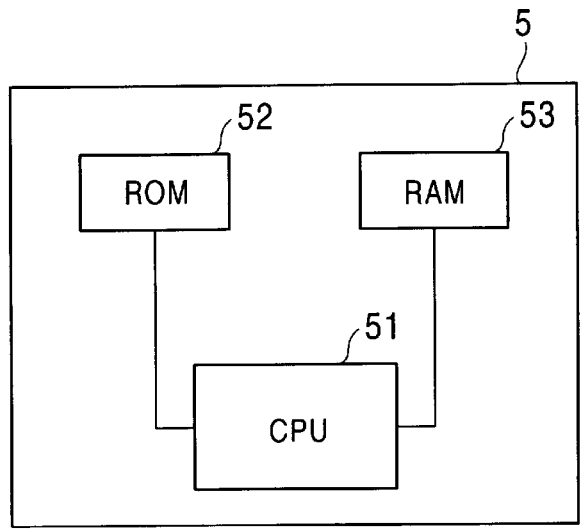
FIG. 2 is a block diagram showing the construction of a recognizing unit of the car navigation system according to the first embodiment.
Figure 3:
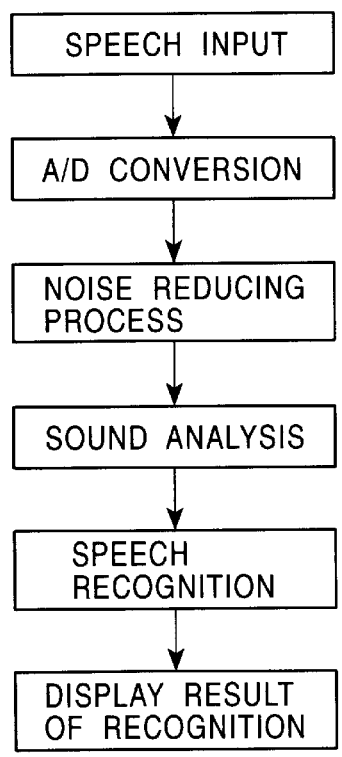
FIG. 3 is a flowchart in the recognizing unit according to the first embodiment.

As shown in FIG. 2, the recognizing unit 5 includes a CPU 51, a ROM 52 for storing a predetermined program therein, and a RAM 53 for storing various data therein. The recognizing unit 5 performs the recognizing process as shown in FIG. 3. That is, the input speech signal is converted from an analog value to a digital value. A noise reducing process and then a sound analysis are applied to the converted speech signal. In the noise reducing process, a known method can be employed. In the sound analysis, the features of the speech are extracted. Thereafter, the speech recognition is performed by comparing these extracted features and a standard pattern. The recognition result is displayed on the monitor 6.

As shown in FIG. 1, this car navigation system is provided with a storage medium 11 for storing map and other information therein.

Figure 4:
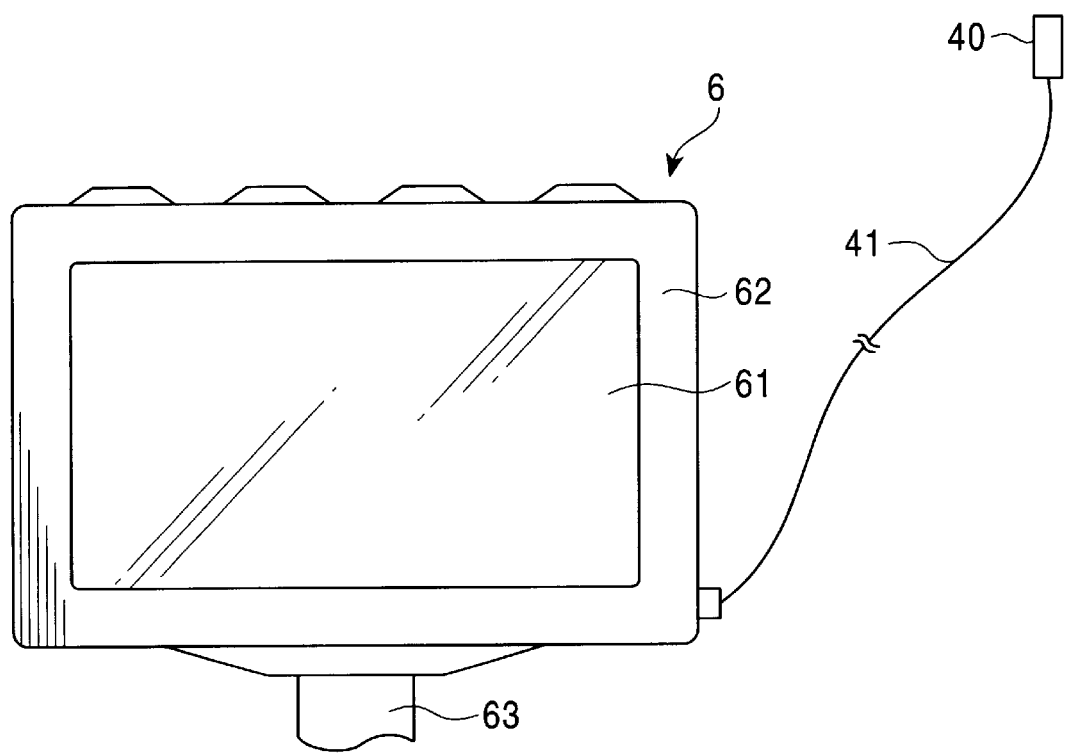
FIG. 4 is a front view of a monitor according to the first embodiment.

FIG. 4 shows a front view of the monitor 6. The monitor 6 includes a display unit 61 for displaying map and other information and a monitor enclosure 62 for containing the display unit 61 and the like therein. The microphone cable 41 of microphone 40 is led from the monitor enclosure 62 of the monitor 6. Although the microphone cable 41 is fixed to the monitor enclosure 62 in the present embodiment, the microphone cable 41 may be attachable to the monitor enclosure 62.

The monitor 6 is installed via a column 63 in a front part of the cabin such as the dashboard or a console box. When the microphone 40 is installed on a conventional place such as the sun visor or the dashboard, approximately one to two meters of the microphone cable 41 suffices for wiring. The microphone 40 may be installed on an arbitrary place in the cabin, other than the sun visor or the dashboard. However, since a speaker for the microphone 40 is more likely to be a driver or one sitting next to the driver, the microphone 40 may be installed on any part of the front side of the cabin.

According to the present embodiment, since the monitor 6 is disposed in the front part of the cabin, the wiring work for the microphone cable 41 is simpler than the conventional wiring work in which the microphone cable is wired to the front part of the cabin from the trunk.

In the present embodiment, the conventional microphone and the conventional microphone cable can be used as the microphone 40 and the microphone cable 41, respectively. For example, a unidirectional microphone or an omnidirectional microphone can be used as the microphone 40. The unidirectional microphone is preferable because of its less noise-pickup nature. Although the microphone 40 is solely installed on the present embodiment, a plurality of microphones 40 may be installed.

Second Embodiment

The second embodiment according to the present invention is described with reference to FIGS. 5 and 6. The construction of the car navigation system according to the second embodiment is basically the same as that of the first embodiment. The primary difference between the first embodiment and the second embodiment is described below.

Figure 5:
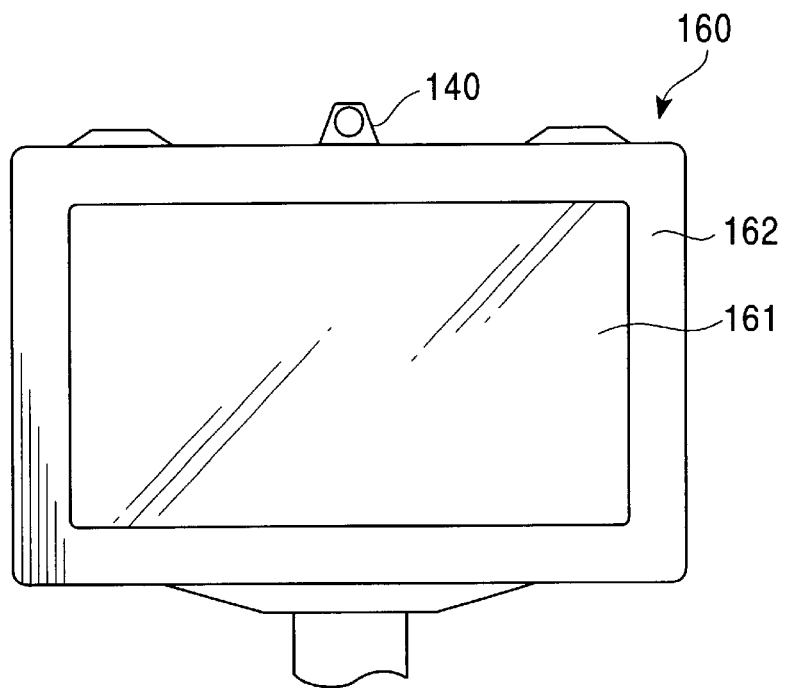
FIG. 5 is a front view of a monitor, having a microphone installed on the monitor, according to a second embodiment.
Figure 6:
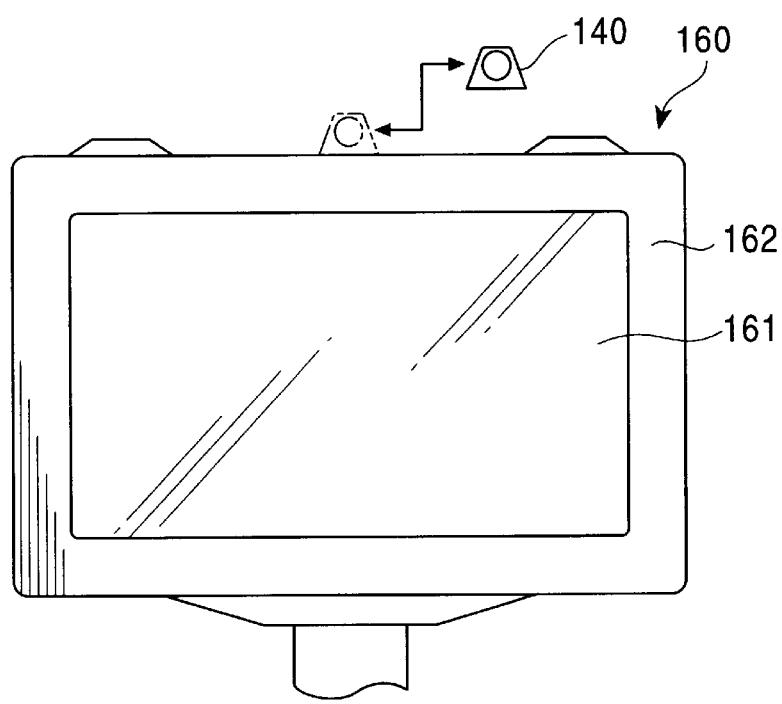
FIG. 6 is a front view of the monitor, having the microphone removed from the monitor, according to the second embodiment.

As shown in FIG. 5, a monitor 160 includes a display unit 161 for displaying map and other information and a monitor enclosure 162 for containing the display unit 161 and the like therein. The microphone 140 is directly connected to the monitor enclosure 162 in the second embodiment whereas the microphone 40 is connected to the monitor enclosure 62 via the microphone cable 1 in the first embodiment. In addition, a connector that is to be connected to the microphone 140 is provided in the monitor enclosure 162. As shown in FIG. 6, the microphone 140 is attachable to the monitor enclosure 162.

According to the above second embodiment, the microphone 140 is directly connected to the monitor enclosure 162. This eliminates the wiring work for the microphone cable. Furthermore, due to the lack of cable wiring in the cabin, exposed microphone cable is prevented and the appearance remains unspoiled.

In addition, a noise reducing effect can be expected by directly connecting the microphone 140 to the monitor 160, that is, installing the microphone 140 on the monitor 160 in an integrated manner. This is because the sensitivity of the microphone 140 is improved by a diffraction effect of the entire monitor 160. One can experience the sensitivity improvement due to a diffraction effect by putting the palms behind the ears when listening to a soft sound.

Figure 7A:
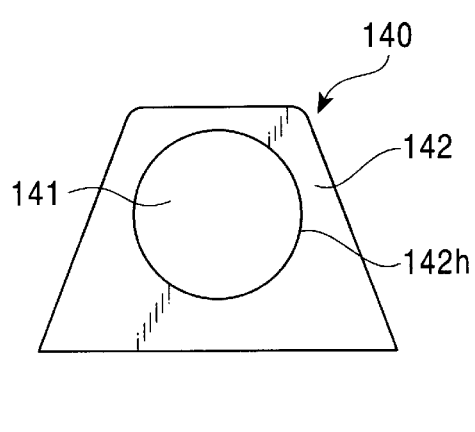
FIGS. 7A and 7B are diagrams showing the construction of the microphone according to the second embodiment.
Figure 7B:
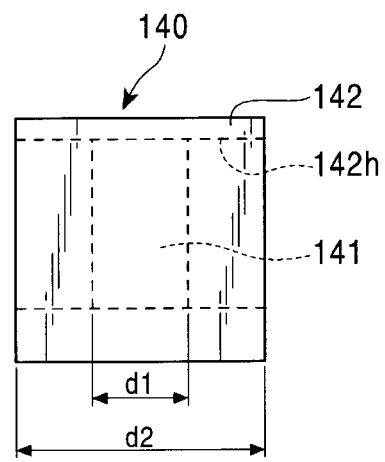

In this second embodiment, as shown in FIGS. 7A and 7B, the microphone 140 includes a microphone main body 141 and a microphone enclosure 142. Although this microphone main body 141 is constructed using the unidirectional microphone, combining the microphone main body 141 with the microphone enclosure 142 controls the directivity characteristic, amplifies the speech, and reduces the noise. The directivity of the unidirectional microphone main body 141 can be improved by making a sufficient distance between the front sound terminal and the rear sound terminal thereof, namely, the distance between the two sound terminals.

FIG. 7A shows a front view of the microphone 140 and FIG. 7B shows a side view of the microphone 140. A cross section of the microphone enclosure 142 having a via hole 142h is trapezoidal. The microphone main body 141 is disposed in the middle of the via hole 142h in the penetrating direction. The distance between the two sound terminals of a single unit of the microphone main body 141 is a distance d1. By combining the microphone main body 141 with the microphone enclosure 142, a distance d2 between the two sound terminals of the microphone 140 can be increased so as to be longer than the distance d1 between the two sound terminals of the microphone main body 141. Commercially available microphone main bodies 141 are often simple columns, as shown in FIG. 7. According to the present embodiment, there is an advantage in that the distance between the two sound terminals can be increased by combining the commercially available microphone main body 141 with the microphone enclosure 142 for installing the microphone main body 141 on the monitor 160.

Although the microphone enclosure 142 is trapezoidal in the present embodiment, the present invention is not restricted to this. The microphone enclosure 142 may take any form as long as functions are provided for installing the microphone unit 140 on the monitor 160 and for increasing the distance between the two sound terminals.

Figure 8A:
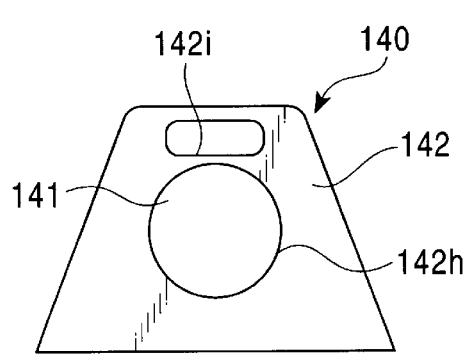
FIGS. 8A and 8B are diagrams showing another construction of the microphone according to the second embodiment.
Figure 8B:
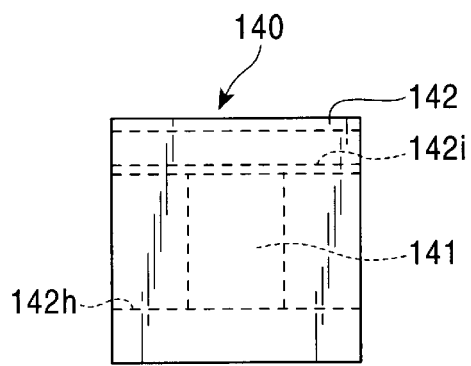

FIGS. 8A and 8B show another construction of the microphone 140. The microphone 140 shown in FIG. 8 differs from the microphone 140 shown in FIG. 7 in that a via hole 142i is formed at the upper part of the microphone enclosure 142. Otherwise, they are basically identical in terms of their construction. Air flows through the via hole 142i, preventing solar radiation and the like from heating the microphone 140.

Third Embodiment

Figure 9:
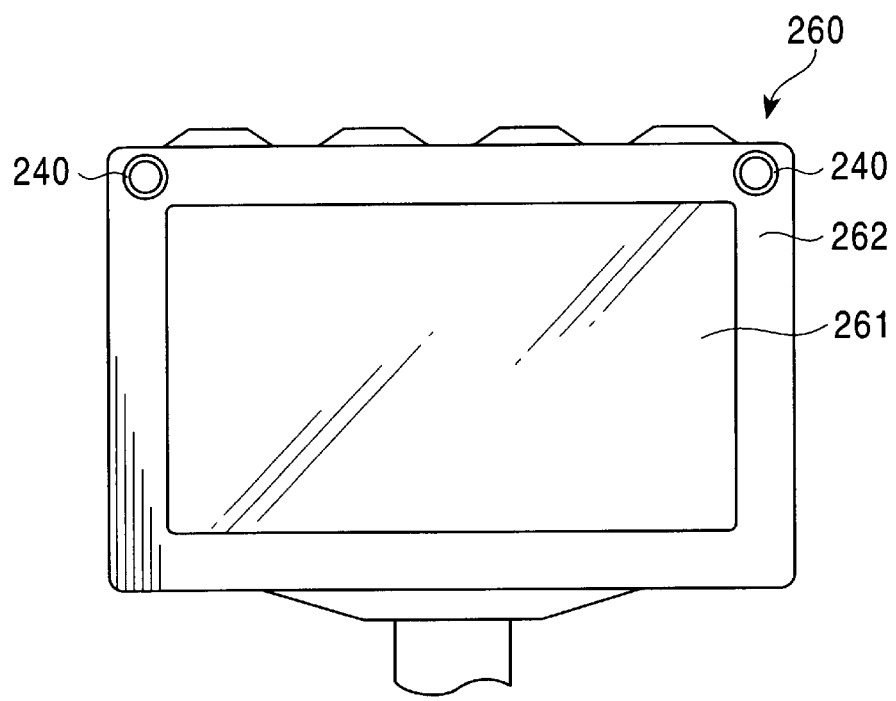
FIG. 9 is a front view of a monitor according to a third embodiment.
Figure 10:
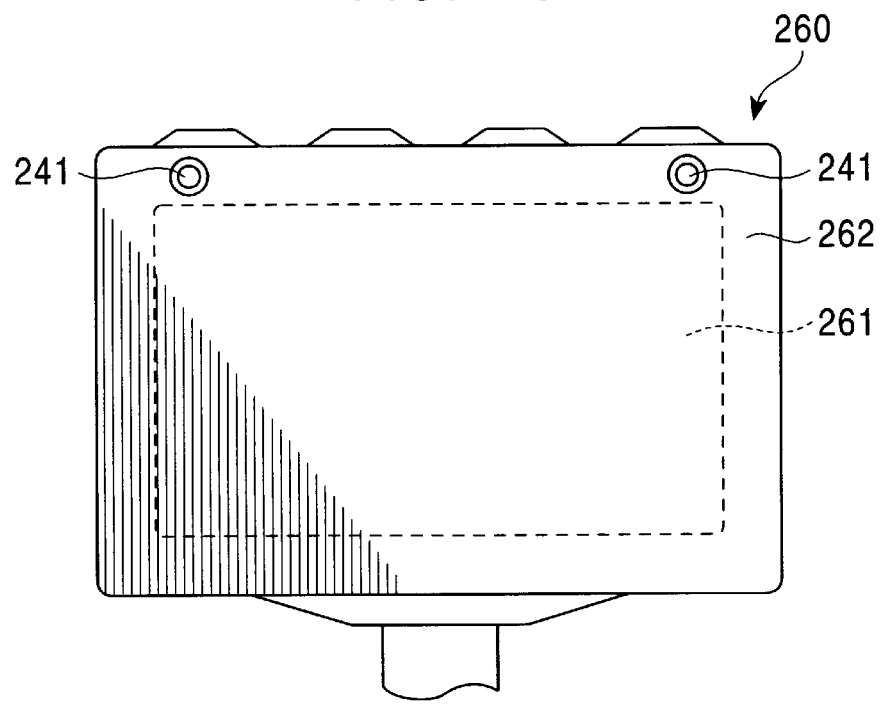
FIG. 10 is a rear view of the monitor according to the third embodiment.

The third embodiment according to the present invention is described with reference to FIGS. 9 and 10. The construction of the car navigation system according to the third embodiment is basically the same as those of the first and second embodiments. The primary difference between the foregoing embodiments and the third embodiment is described below. FIGS. 9 and 10 show front and rear views, respectively, of a monitor 260 according to the third embodiment.

As shown in FIG. 9, the monitor 260 according to the third embodiment includes a display unit 261 for displaying map and other information and a monitor enclosure 262 for containing the display unit 261 and the like. A microphone 240 is embedded inside the monitor enclosure 262 in the third embodiment whereas the microphone 140 is externally installed on the monitor enclosure 162 in the second embodiment.

According to the above third embodiment, the microphone 240 is directly connected to the monitor enclosure 262. Therefore, in the same manner as in the second embodiment, the wiring work for the microphone cable is not required, which means that no microphone cable is exposed in the cabin. Furthermore, since the microphone 240 is embedded in the monitor enclosure 262, the microphone 240 is not outwardly projected from the monitor 260, unlike the microphone 140 in the second embodiment. This gives a neat appearance.

In addition, since the microphone 240 is installed on the monitor 260 in the same manner as in the second embodiment, the diffraction effect of the entire monitor 260 can improve the sensitivity of the microphone 240.

In the third embodiment, as shown in FIG. 10, a noise microphone 241 for capturing the noise is incorporated in the monitor enclosure 262 on the rear side of the monitor 260. The microphone 240 shown in FIG. 9 captures not only the speech but also the noise whereas the noise microphone 241 captures the noise. Therefore, only the speech signal can be extracted by subtracting "the noise signal", captured from the noise microphone 241 from "the speech signal+ the noise signal" captured from the microphone 240.

Arts for only extracting the speech signal by allowing one microphone to be used for "the speech signal +the noise signal" while allowing the other microphone to be used for "the noise signal" have been already known. However, the construction such as that of the third embodiment is novel in that the microphone 240 which captures "the speech signal + the noise signal" and the noise microphone 241 which captures "the noise" are disposed on the front and the rear, respectively, of the monitor 260.

When the microphone 240 and the noise microphone 241 are disposed apart, a difference occurs between the noise signal captured by the microphone 240 and the noise signal captured by the noise microphone 241. This makes the process of subtracting "the noise signal" from "the speech signal + the noise signal" less practical. Therefore, it is desirable that the microphone 240 and the noise microphone 241 be provided in proximity to each other. However, since the noise microphone 241 is expected to capture the noise signal, the noise microphone 241 should be disposed at such a place that the speech from a speaker is difficult to pick up. In view of this, the microphone 240 and the noise microphone 241 should not be disposed in close proximity to each other.

However, as shown in the third embodiment, the monitor 260 blocks the speech from the speaker by disposing the noise microphone 241 at the rear side of the monitor 260. This means that the noise microphone 241 is disposed at such a place that the speech from the speaker is difficult to pick up. This also satisfies a requirement in which the noise microphone 241 should be disposed in proximity of the microphone 240. Therefore, the process of subtracting "the noise signal" from "the speech signal + the noise signal" becomes effective.

Although, in the third embodiment, two microphones 240 and two noise microphones 241 are provided in the monitor 260, the present invention is not restricted to this. Alternatively, one microphone 240 and one noise microphone 241 may be provided, or three or more microphones 240 and three or more noise microphones may be provided. Although the microphones 240 and the noise microphones are disposed at both ends of the upper part of the monitor 260, the present invention is not restricted to this. The disposed locations of the microphones 240 and the noise microphones 241 can be appropriately determined in accordance with the number thereof.

Figure 11:
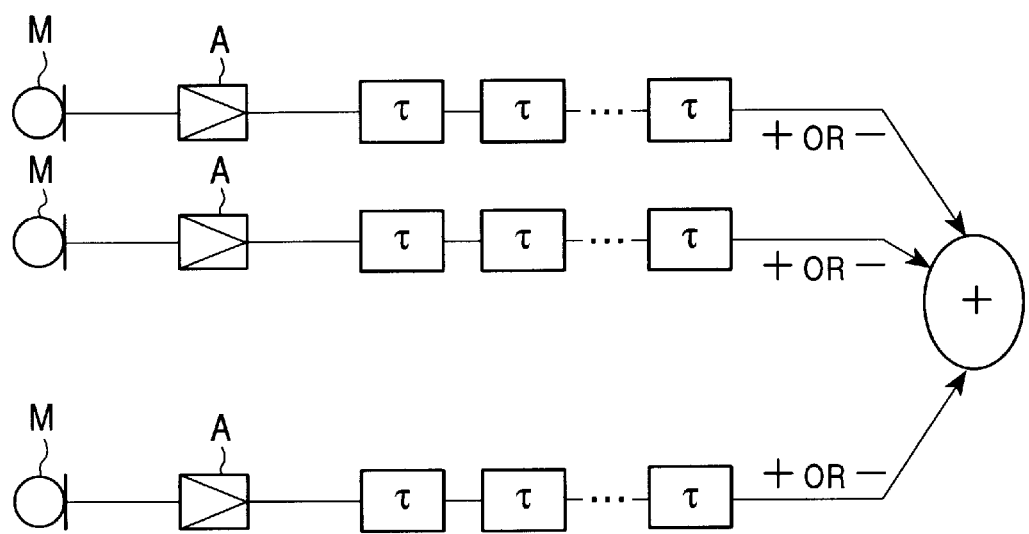
FIG. 11 is a diagram showing one example of an electrical mechanism for reducing the noise.

Noise reduction can be also performed using an electrical device, for example, shown in FIG. 11, other than the above described ones. In FIG. 11, M, A, and X represent the microphone, an amplifier, and one sample delay, respectively. This known electrical noise-reducing device may be provided in the present embodiment.

Fourth Embodiment

Figure 12:
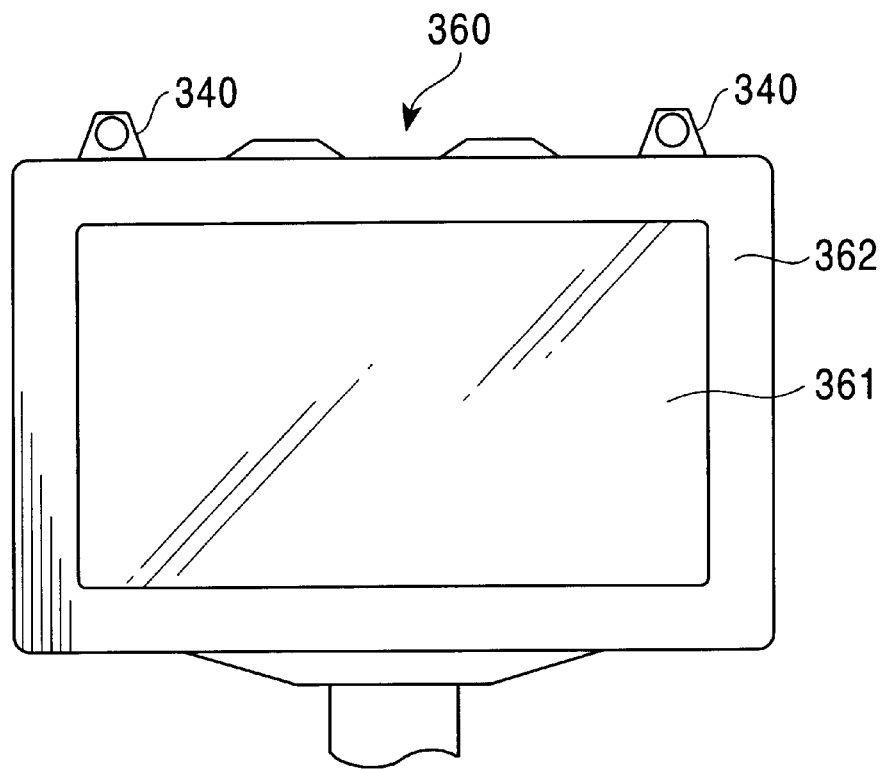
FIG. 12 is a front view of a monitor according to a fourth embodiment.
Figure 13:
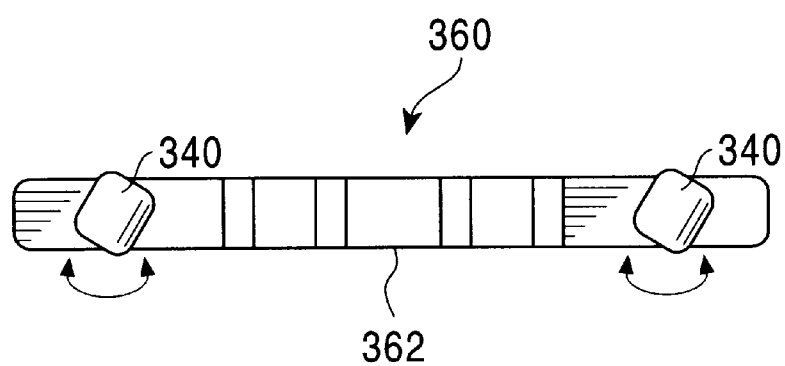
FIG. 13 is a plan view of the monitor according to the fourth embodiment.

The fourth embodiment according to the present invention is described with reference to FIGS. 12 and 13. The construction of the car navigation system according to the fourth embodiment is basically the same as those of the first to third embodiments. The primary difference between the foregoing embodiments and the fourth embodiment is described below. FIG. 12 shows a front view of a monitor 360 according to the fourth embodiment and FIG. 13 shows a plan view thereof.

As shown in FIG. 12, the monitor 360 according to the fourth embodiment includes a display unit 361 for displaying map and other information and a monitor enclosure 362 for containing the display unit 361 and the like therein. In the fourth embodiment, a microphone 340 is directly connected to the monitor enclosure 362 in the same manner as in the second embodiment. In the second embodiment, the microphone 140 is attachable to the microphone enclosure 162, but the orientation thereof cannot be altered. However, in the fourth embodiment, the microphone 140 is constructed so that the orientation thereof can be altered. That is, as shown in FIG. 13, the microphone 340 is installed so as to be rotatable with respect to the monitor 360. Accordingly, the directivity axis of the microphone 340 can be faced to the speaker, namely, a sound source.

The rotation of the microphone 340 may be manually performed or may be performed by a driving source such as a motor. In a case in which a plurality of microphones 340 is provided in the same manner as in the fourth embodiment, a plurality of microphones 340 can be simultaneously rotated by means of a mechanical link or the like. Although the case is shown in which the orientation of the microphone 340 is horizontally altered in the fourth embodiment, the orientation of the microphone 340 may be vertically altered.

In addition, the optimum orientation of the microphone 340 may be preset for each speaker. When the speaker is a driver, the orientation of the microphone 340 is altered so that the microphone 340 faces in accordance with the preset direction. For example, when a family uses a vehicle provided with the car navigation system according to the fourth embodiment, the orientation of the microphone 340 is preset for each driver of the family. When a member of the family drives the vehicle, his or her preset orientation of the microphone 340 is read and the orientation of the microphone 340 is set in accordance with the preset orientation.

The preset orientation of the microphone 340 can be realized using a sound-source estimating method. FIG. 14 shows one example of the sound-source estimating method, which makes use of the noise-reducing device shown in FIG. 11. In this noise-reducing device, when T (one sample delay) is applied to each microphone M, the directivity axis of the microphone system can be altered by increasing or decreasing the amount of delay by means of software. For example, four equally spaced microphones M1 to M4 are provided as shown in FIG. 14. In addition to an output signal system, a sound estimating system is provided in which the amount of delay is sequentially altered as follows:

1) Six sample delays are applied to the output of the microphone M1, four sample delays are applied to the output of the microphone M2, two sample delays are applied to the output of the microphone M3, and no delay is applied to the output of the microphone M4, whereby the speech output level is found by adding these outputs;

2) No delay is applied to the output of the microphone M1, two sample delays are applied to the output of the microphone M2, four sample delays are applied to the output of the microphone M3, and six sample delays are applied to the output of the microphone M4, whereby the speech output level is found by adding these outputs; and 3) No delay is applied to the output of each of the microphones M1 to M4, whereby the speech output level is found by adding these outputs.

A sound source estimating process is performed by selecting the highest level from among these speech output levels and then duplicating the way the corresponding delays are applied to the corresponding microphones at the case, in which the selected highest speech output level is obtained, to the output signal system.

Other than the above-described sound-source estimating method, any known method can be applied in order to preset the microphone 340.

Fifth Embodiment

The fifth embodiment according to the present invention is described with reference to FIGS. 15 and 16. The construction of the car navigation system according to the fifth embodiment is basically the same as that of the first embodiment. A microphone 440 is connected to a monitor 460 via a microphone cable 441.

Figure 16:
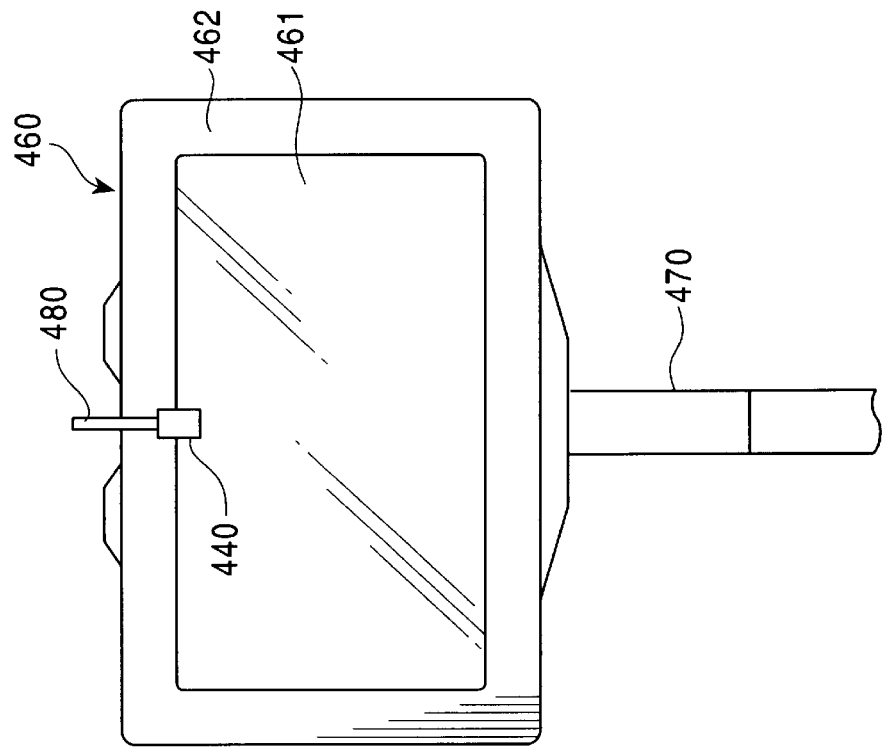
FIG. 16 is a front view of the monitor according to the fifth embodiment.
Figure 15:
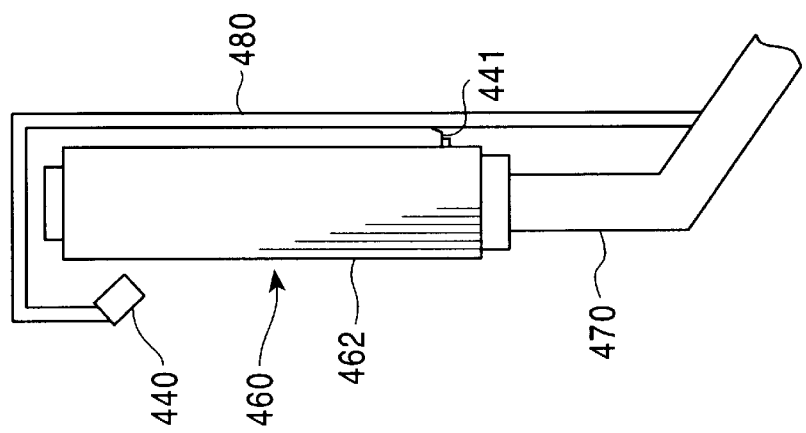
FIG. 15 is a side view of a monitor according to a fifth embodiment.

As shown in FIGS. 15 and 16, the monitor 460 according to the fifth embodiment includes a display unit 461 for displaying map and other information and a monitor enclosure 462 for containing the display unit 461 and the like therein. The monitor 460 is installed via a column 470 at an arbitrary position in the front part of the cabin. It is normally installed in the middle of the dashboard in the width direction of the vehicle. An L-shaped hollow arm 480 is extended from the column 470 in order to fix the microphone 440. The microphone 440 is mounted on the end part of the arm 480. The microphone 440 is disposed in proximity of the surface of the monitor 460. The microphone 440 is connected via the microphone cable 441 to the monitor 460. The microphone cable 441 is led from the rear face of the monitor 460, and is connected via the hollow part of the arm 480 to the microphone 440.

When the microphone 140 (240, or 340) and the monitor 160 (, 260, or 360) are directly connected, as shown in the second embodiment (, third, or fourth embodiment), the diffraction effect of the entire monitor 160 (, 260, or 360) can improve the sensitivity of the microphone 140 (, 240, or 340). In the fifth embodiment, the microphone 440, which is connected via the microphone cable 441 to the monitor 460, is disposed using the arm 480 so as to be in close proximity of the surface of the monitor 460. Therefore, the diffraction effect of the entire monitor 460 can improve the sensitivity of the microphone 440.

What is claimed is:

1. An in-vehicle device capable of being controlled by speech recognition, comprising:

a monitor for displaying map information and other information; and a plurality of microphones wherein said plurality of microphones are mounted directly on said monitor;

wherein the orientation of said plurality of microphones is realized by applying a predetermined delay to each of said plurality of microphones to alter a directivity axis, to apply a sound-source estimating method.

2. The in-vehicle device according to claim 1, wherein said plurality of microphones are attachable and detachable to said monitor.

3. The in-vehicle device according to claim 1, wherein said plurality of microphones are mounted directly to said monitor so that the orientation of said plurality of microphones are horizontally or vertically adjustable and rotatable.

4. The in-vehicle device according to claim 1, further comprising electric noise-reducing means for reducing noise input from said plurality of microphones.

5. The in-vehicle device according to claim 1, wherein said predetermined delay is adjusted to alter said directivity axis, and a preferred orientation of said plurality of microphones is selected so that the highest speech output level from a plurality of speech output levels is obtained.

6. A monitor device comprising:

a monitor main body for displaying map information and other information;

a plurality of speech input microphones for inputting speech and noise; and a plurality of noise input microphones for inputting noise;

wherein said plurality of speech input microphones are provided on the front face of said monitor main body;

wherein said plurality of noise input microphones are provided on the rear face of said monitor main body; and wherein said plurality of speech input microphones and said plurality of noise input microphones are integrated within said monitor; and wherein the orientation of said plurality of microphones is realized by applying a predetermined delay to each of said plurality of microphones to alter a directivity axis, to apply a sound-source estimating method.

7. The monitor device according to claim 6, wherein said predetermined delay is adjusted to alter said directivity axis, and a preferred orientation of said plurality of microphones is selected so that the highest speech output level from a plurality of speech output levels is obtained.

8. An in-vehicle device capable of being controlled by speech recognition, comprising:

a monitor for displaying map information and other information; and a plurality of microphones wherein said plurality of microphones are integrated within said monitor;

wherein the orientation of said plurality of microphones is realized by applying a predetermined delay to each of said plurality of microphones to alter a directivity axis, to apply a sound-source estimating method.

9. The in-vehicle device according to claim 8, further comprising electric noise-reducing means for reducing noise input from said plurality of microphones.

10. The in-vehicle device according to claim 8, wherein said predetermined delay is adjusted to alter said directivity axis, and a preferred orientation of said plurality of microphones is selected so that the highest speech output level from a plurality of speech output levels is obtained.

* * * * *